United States Patent
Zhang et al.

(10) Patent No.: US 10,108,019 B1
(45) Date of Patent: Oct. 23, 2018

(54) PROJECTION KALEIDOSCOPE

(71) Applicant: GEMMY INDUSTRIES CORPORATION, Coppell, TX (US)

(72) Inventors: Cheng Chun Zhang, Shenzhen (CN); Lio Yenwei Chang, Coppell, TX (US)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 0 days.

(21) Appl. No.: 15/653,267

(22) Filed: Jul. 18, 2017

(51) Int. Cl.
*G02B 27/08* (2006.01)
*G02B 27/18* (2006.01)

(52) U.S. Cl.
CPC .............. *G02B 27/08* (2013.01); *G02B 27/18* (2013.01)

(58) Field of Classification Search
CPC ...................................................... G02B 27/08
USPC .................................. 359/616–617; 353/1–2
See application file for complete search history.

(56) References Cited

U.S. PATENT DOCUMENTS

| | | | | |
|---|---|---|---|---|
| 2,665,609 A | * | 1/1954 | Gilluly | G09F 19/18 353/1 |
| 3,030,856 A | * | 4/1962 | Jordan | G09F 19/18 353/1 |
| 4,247,181 A | * | 1/1981 | Inness-Brown | G03B 21/001 353/1 |
| 4,527,186 A | * | 7/1985 | Acker | H04N 9/43 348/578 |
| 5,426,474 A | * | 6/1995 | Rubtsov | G02B 6/04 353/1 |
| 6,305,808 B1 | * | 10/2001 | Ochi | G02B 27/08 359/616 |
| 2015/0234194 A1 | * | 8/2015 | Chou | G02B 27/08 353/1 |

* cited by examiner

*Primary Examiner* — Christopher Mahoney
(74) *Attorney, Agent, or Firm* — Lynette Wylie; Apex Juris, pllc.

(57) ABSTRACT

A projection kaleidoscope has a shell, a light supply device, a rotating device, a film unit, a reflex cone, and a projecting convex lens. The light supply device is mounted in the shell and has a light-emitting part and a light converging unit. The rotating device is mounted in the shell and has a driver and a transmission connected to the driver. The film unit is mounted on the transmission of the rotating device and faces the light converging unit of the light supply device. The reflex cone is mounted on the transmission of the rotating device and faces the film unit and the projecting opening. The projecting convex lens is mounted in the shell and faces the reflex cone. The rotating device drives the film unit and the reflex cone to rotate in reverse to each other.

18 Claims, 7 Drawing Sheets

PROJECTION KALEIDOSCOPE

BACKGROUND OF THE INVENTION

1. Field of the Invention

The present invention relates to a projection kaleidoscope, and more particularly to a projection kaleidoscope that can project a pattern formed in the projection kaleidoscope.

2. Description of Related Art

A conventional kaleidoscope has a cylinder with a chamber formed in the cylinder. A first opening and a second opening are respectively formed on two ends of the cylinder. The first opening and the second opening both communicate with the chamber of the cylinder. The conventional kaleidoscope has a pattern unit and a reflex cone. The pattern unit is mounted in the first opening of the cylinder. The reflex cone is mounted in the chamber of the cylinder. The pattern unit is colorful. The conventional kaleidoscope may form a picture by a reflection of light. The image of the pattern unit is reflected many times to form diversified pictures.

To view variations of the pictures, a user has to place his eyes close to the second opening of the cylinder for watching. The conventional kaleidoscope only provides one user to watch each time. The picture of the conventional kaleidoscope cannot be displayed for many users to view simultaneously.

To overcome the shortcomings, the present invention provides a projection kaleidoscope to mitigate or obviate the aforementioned problems.

SUMMARY OF THE INVENTION

The objective of the invention is to provide a projection kaleidoscope to resolve the problem that the images of the conventional kaleidoscope cannot be displayed for many users to watch simultaneously.

The projection kaleidoscope of the present invention has a shell, a light supply device, a rotating device, a film unit, a reflex cone, and a projecting convex lens. The shell has a front side, a rear side, a chamber, a projecting opening, a first supporting seat, and a second supporting seat. The chamber is formed in the shell. The projecting opening is formed on the front side of the shell and communicates with the chamber. The first supporting seat is mounted in the chamber of the shell and faces the front side of the shell. The second supporting seat is mounted in the chamber of the shell and faces the rear side of the shell. The light supply device is mounted on the second supporting seat of the shell, faces the first supporting seat of the shell, and has a light-emitting part and a light converging unit. The light-emitting part is mounted on the second supporting seat of the shell. The light converging unit is mounted on the light-emitting part of the light supply device. The rotating device is mounted on the first supporting seat of the shell. The rotating device has a driver and a transmission. The driver is mounted on the first supporting seat of the shell. The transmission is mounted on the first supporting seat of the shell and is connected to the driver of the rotating device. The film unit is mounted on the transmission of the rotating device and faces the light converging unit of the light supply device. The reflex cone is mounted on the transmission of the rotating device and has two ends. The two ends of the reflex cone respectively face the film unit and the projecting opening. The projecting convex lens is mounted in the projecting opening of the shell and faces the reflex cone. The rotating device drives the film unit and the reflex cone to rotate relative to each other. A rotation direction of the film unit and a rotation direction of the reflex cone are reverse to each other.

The reflex cone has three flat reflex lenses and a space. The three flat reflex lenses are connected to each other to form a triangular tube. The space is formed in the reflex cone and is surrounded by the three flat reflex lenses.

Alternatively, the reflex cone has multiple flat reflex lenses and a space. The multiple flat reflex lenses are connected to each other to form a polygonal tube. The space is formed in the reflex cone and is surrounded by the multiple flat reflex lenses.

The first supporting seat has a front surface and a rear surface. The driver is mounted on the front surface of the first supporting seat. The transmission is mounted on the rear surface of the first supporting seat and has a first gear, a second gear, a third gear, and a fourth gear. The first gear is connected to the driver. The second gear engages with the first gear. The third gear engages with the second gear and has a shaft. The film unit is fixedly mounted on the shaft of the third gear. The fourth gear engages with the first gear. The reflex cone has a rear end extending through the fourth gear. A rotation direction of the third gear and a rotation direction of the fourth gear are reverse to each other.

The second supporting seat has a front surface. The light-emitting part has a heat-dissipating fin and a light unit. The heat-dissipating fin is mounted on the front surface of the second supporting seat and has a front surface. The light unit is mounted on the front surface of the heat-dissipating fin. The light converging unit has a connecting tube, a first convex lens, and a second convex lens. The connecting tube is mounted on the heat-dissipating fin and is mounted around the light unit. The first convex lens is mounted in the connecting tube, faces the light unit, and has a first convex arced surface. The second convex lens is mounted in the connecting tube, faces the first convex lens, and has a second convex arced surface facing the first convex arced surface of the first convex lens. The connecting tube has an inner portion and an outer portion. The inner portion has a first semi-ring and a second semi-ring. The second semi-ring is connected to the first semi-ring. The first convex lens and the second convex lens are mounted in the inner portion of the connecting tube. The outer portion is mounted around the inner portion and is mounted on the heat-dissipating fin.

A light beam is generated by the light supply device of the projection kaleidoscope. The light beam passes through the light converging unit to be concentrated, and then projects to the film unit. A pattern of the film unit is projected into the reflex cone. The rotating device drives the film unit and the reflex cone to rotate. The rotation direction of the film unit and the rotation direction of the reflex cone are reverse to each other. The pattern projected from the film unit is reflected and refracted multiple times in the reflex cone. The light beam passes out of the reflex cone and then passes through the projecting convex lens to project a diversified picture, thereby allowing many users to watch simultaneously.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
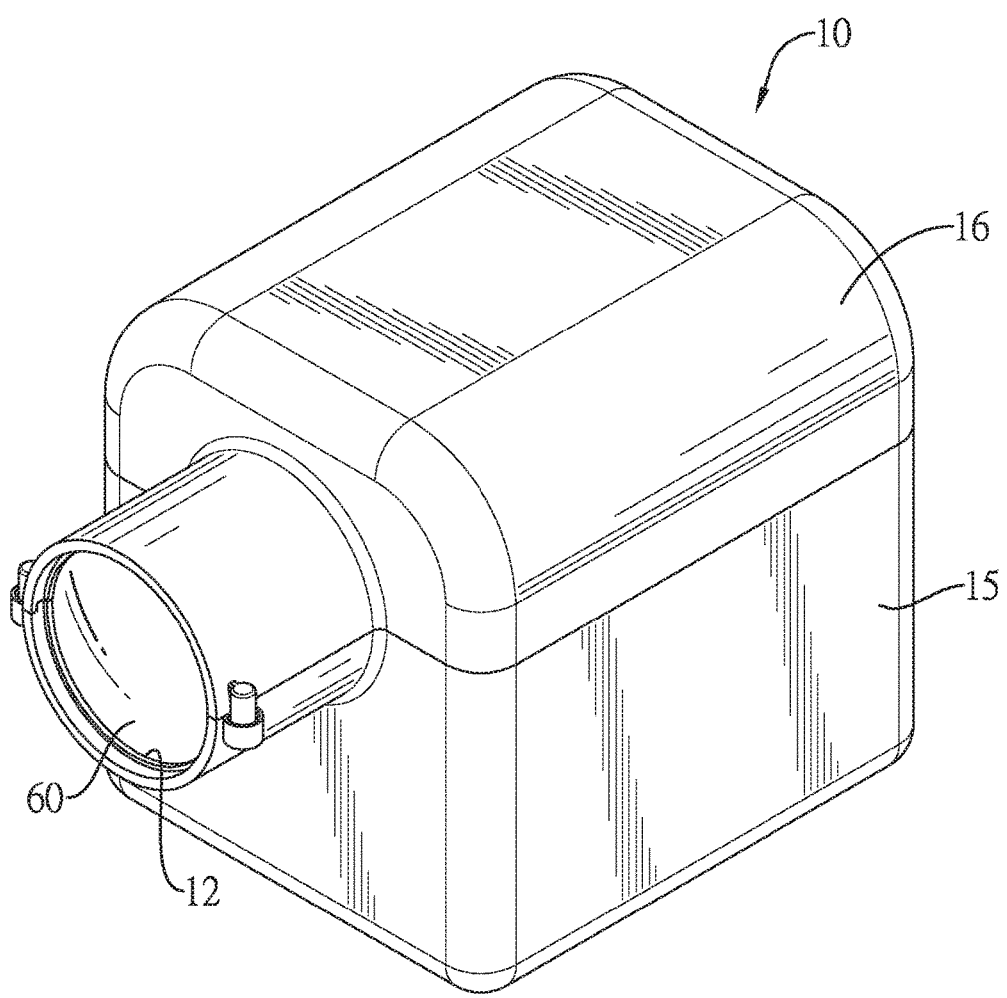
FIG. 1 is a perspective view of a projection kaleidoscope in accordance with the present invention.
Figure 2:
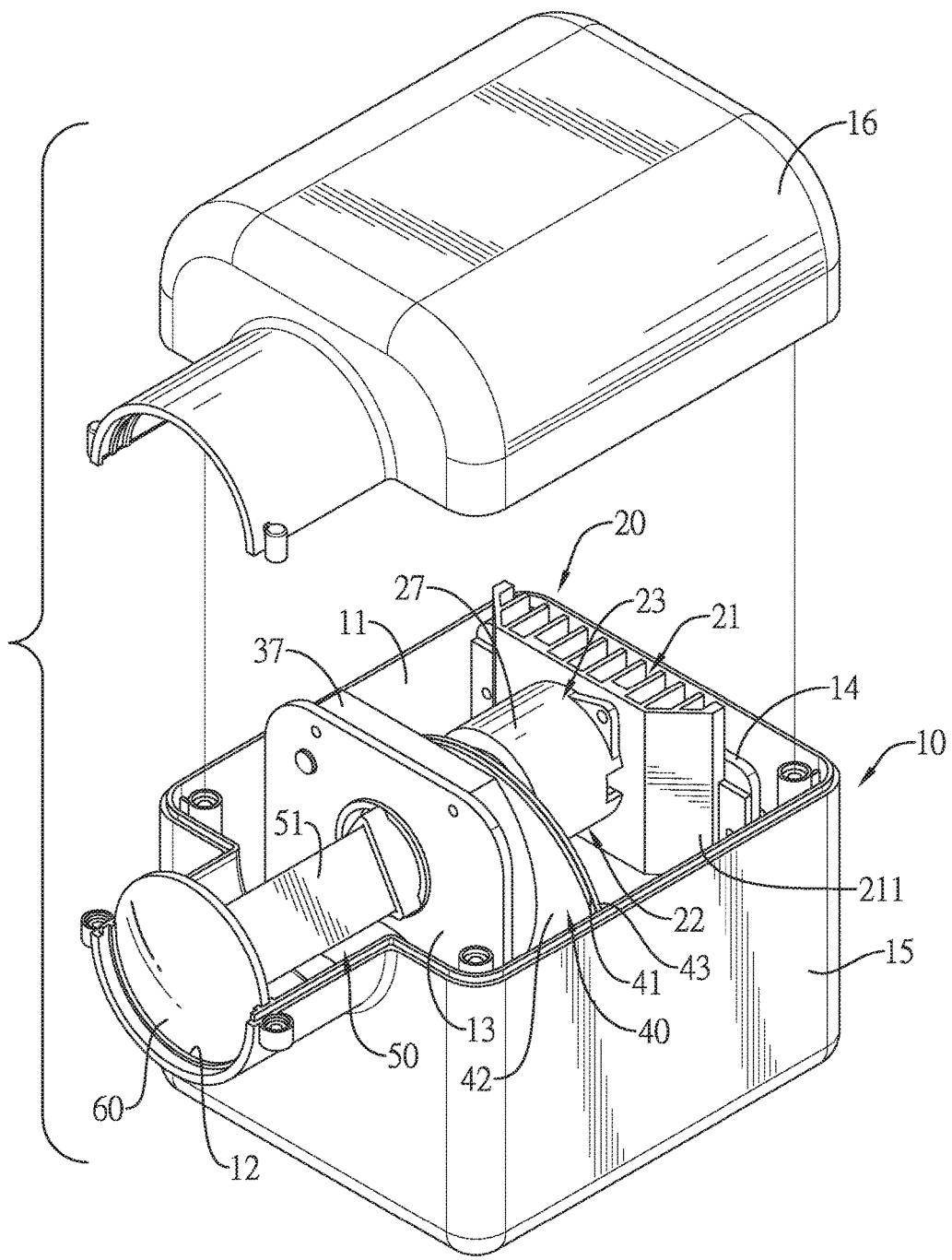
FIG. 2 is an exploded perspective view of the projection kaleidoscope in FIG. 1.
Figure 3:
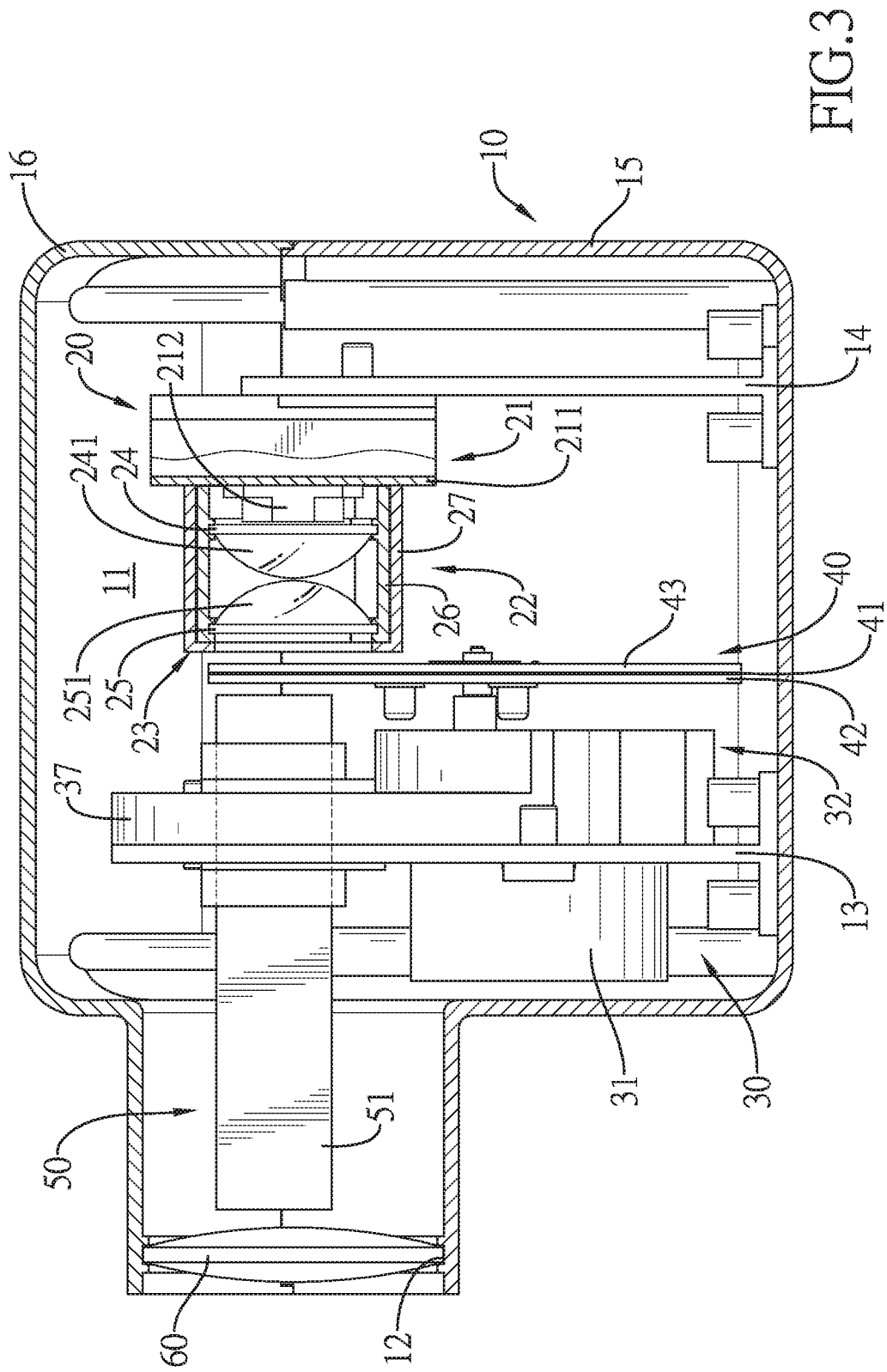
FIG. 3 is side view in partial section of the projection kaleidoscope in FIG. 1.

With reference to FIGS. 1 to 3, a projection kaleidoscope in accordance with the present invention comprises a shell 10, a light supply device 20, a rotating device 30, a film unit 40, a reflex cone 50, and a projecting convex lens 60.

The shell 10 has a front side, a rear side, a chamber 11, a projecting opening 12, a first supporting seat 13, and a second supporting seat 14. The chamber 11 is formed in the shell 10. The projecting opening 12 is formed on the front side of the shell 10 and communicates with the chamber 11. The first supporting seat 13 is mounted in the chamber 11 of the shell 10 and faces the front side of the shell 10. The second supporting seat 14 is mounted in the chamber 11 of the shell 10 and faces the rear side of the shell 10. In addition, the shell 10 has a bottom seat 15 and a top cap 16. The top cap 16 is mounted on the bottom seat 15. The projecting opening 12 is formed between the bottom seat 15 and the top cap 16. The first supporting seat 13 and the second supporting seat 14 are mounted between the bottom seat 15 and the top cap 16.

The light supply device 20 is mounted on the second supporting seat 14 of the shell 10, faces the first supporting seat 13 of the shell 10, and has a light-emitting part 21 and a light converging unit 22. The light-emitting part 21 is mounted on the second supporting seat 14 of the shell 10. The light converging unit 22 is mounted on the light-emitting part 21 of the light supply device 20.

The rotating device 30 is mounted on the first supporting seat 13 of the shell 10. The rotating device 30 has a driver 31 and a transmission 32. The driver 31 is mounted on the first supporting seat 13 of the shell 10. The transmission 32 is mounted on the first supporting seat 13 of the shell 10 and is connected to the driver 31 of the rotating device 30.

The film unit 40 is mounted on the transmission 32 of the rotating device 30 and faces the light converging unit 22 of the light supply device 20. In addition, the film unit 40 has a film 41, a first disc 42, and a second disc 43. The film 41 has a front surface and a rear surface. The first disc 42 is mounted on the front surface of the film 41. The second disc 43 is mounted on the rear surface of the film 41.

Figure 4:
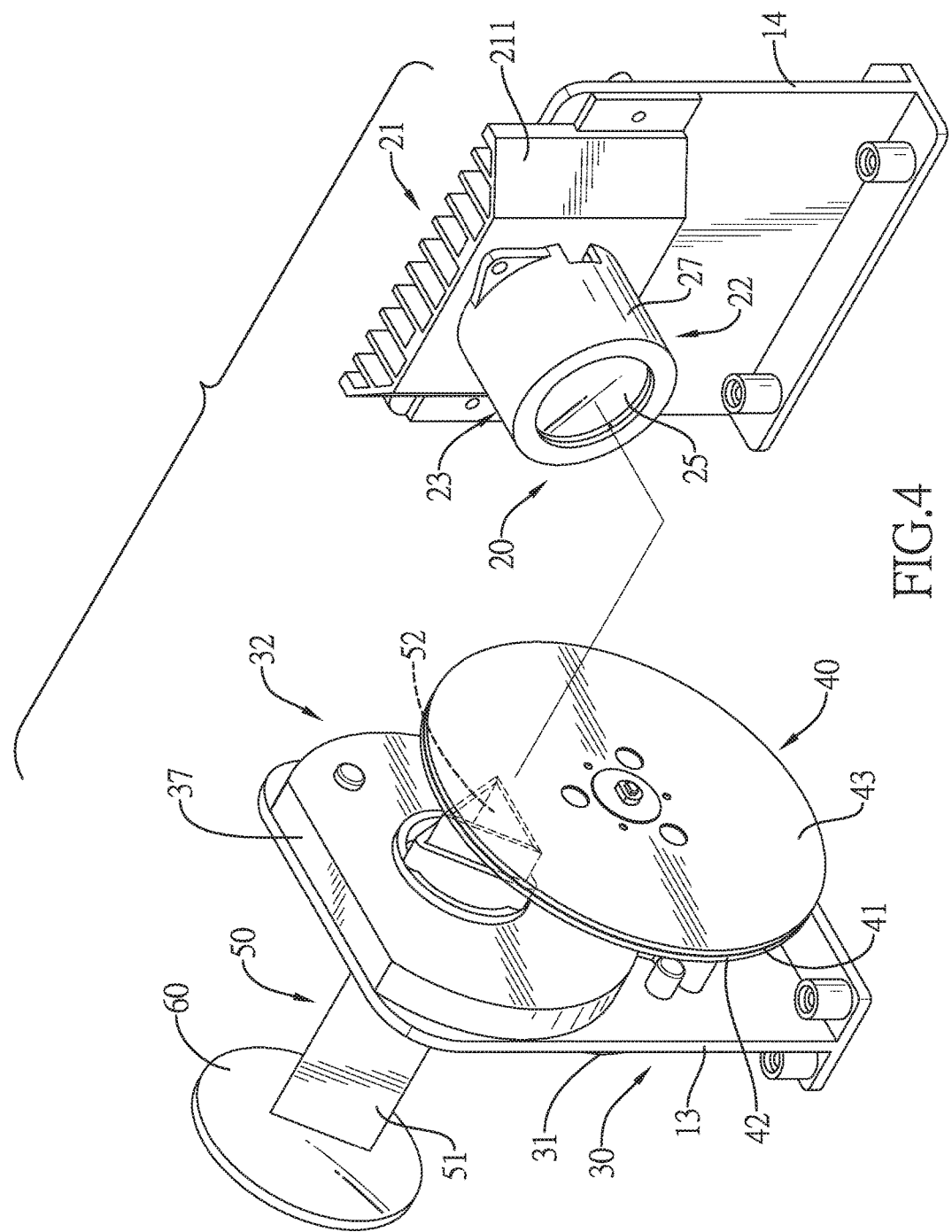
FIG. 4 is an exploded perspective view of a light supply device and a film unit of the projection kaleidoscope in FIG. 2.
Figure 5:
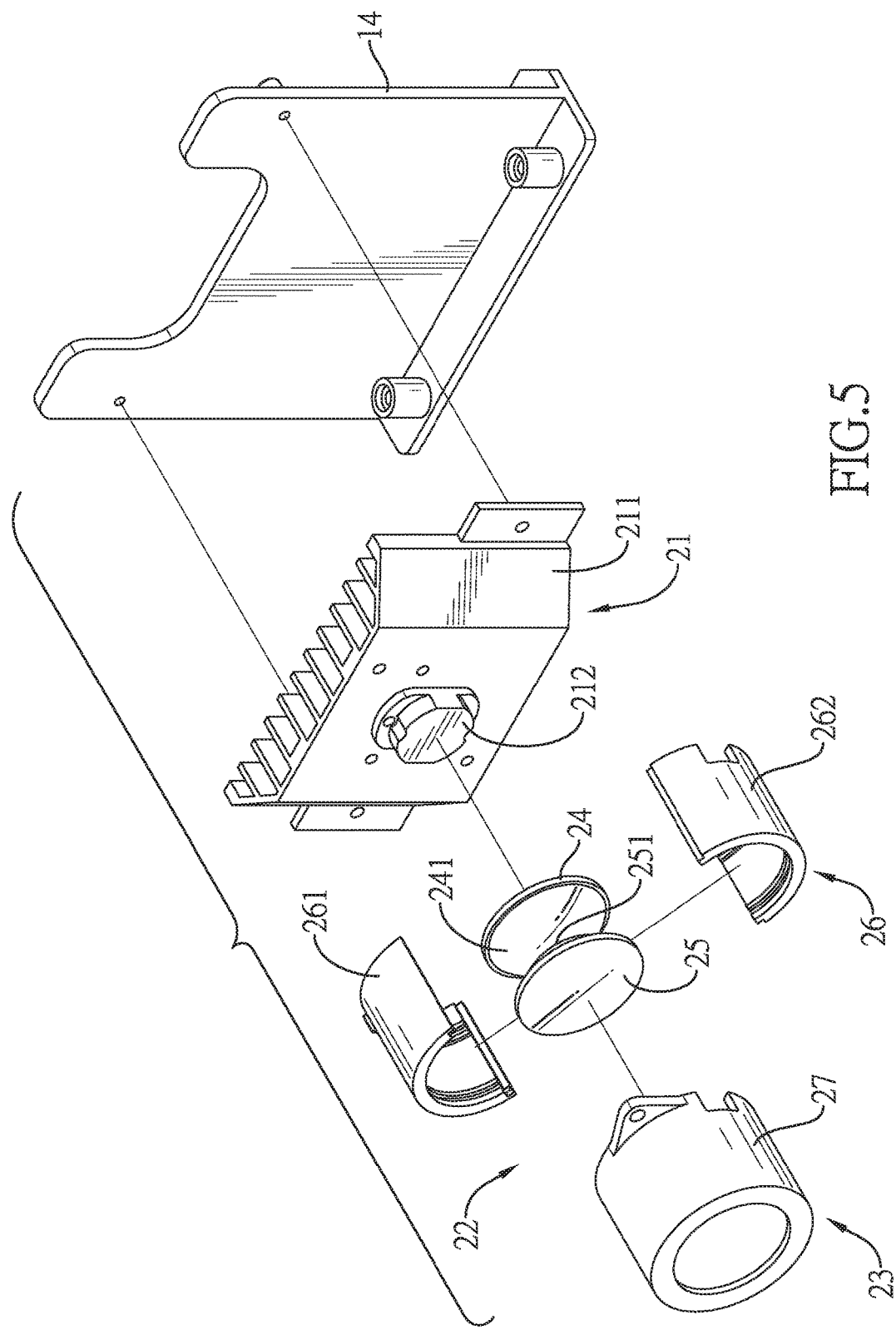
FIG. 5 is an exploded perspective view of the light supply device of the projection kaleidoscope in FIG. 4.

The reflex cone 50 is mounted on the transmission 32 of the rotating device 30 and has two ends. The two ends of the reflex cone 50 respectively face the film unit 40 and the projecting opening 12. The rotating device 30 drives the film unit 40 and the reflex cone 50 to rotate relative to each other. A rotation direction of the film unit 40 and a rotation direction of the reflex cone 50 are reverse to each other. With reference to FIG. 4, the reflex cone 50 has three flat reflex lenses 51 and a space 52. The three flat reflex lenses 51 are connected to each other to form a triangular tube. The space 52 is formed in the reflex cone 50 and is surrounded by the three flat reflex lenses 51. Alternatively, the reflex cone 50 has multiple flat reflex lenses 51 and a space 52. The multiple flat reflex lenses 51 are connected to each other to form a polygonal tube. The space 52 is formed in the reflex cone 50 and is surrounded by the multiple flat reflex lenses 51.

The projecting convex lens 60 is mounted in the projecting opening 12 of the shell 10 and faces a front end of the reflex cone 50. The projecting convex lens 60 is a lenticular lens.

Figure 6:
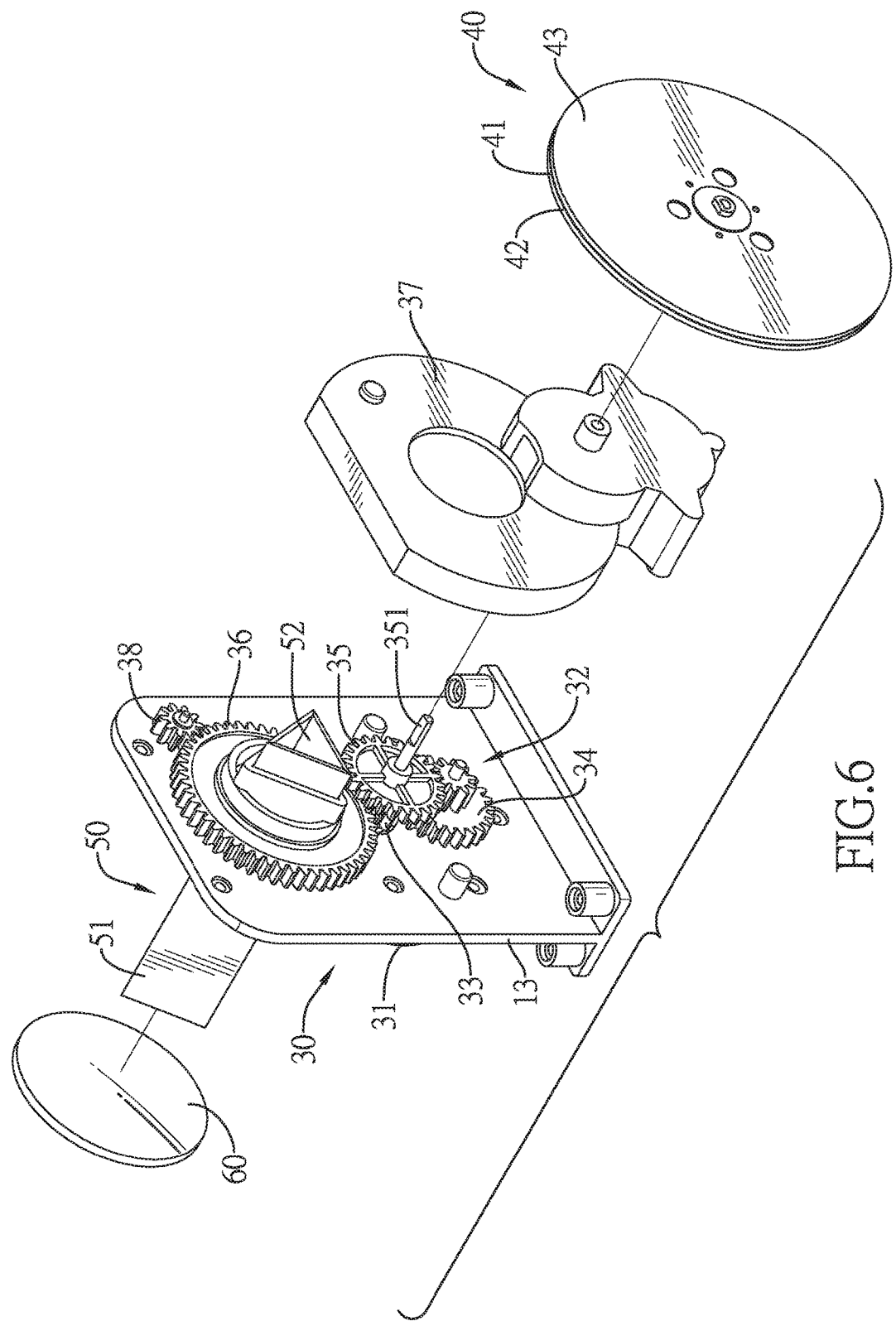
FIG. 6 is an exploded perspective view of the film unit and a rotating device of the projection kaleidoscope in FIG. 2.
Figure 7:
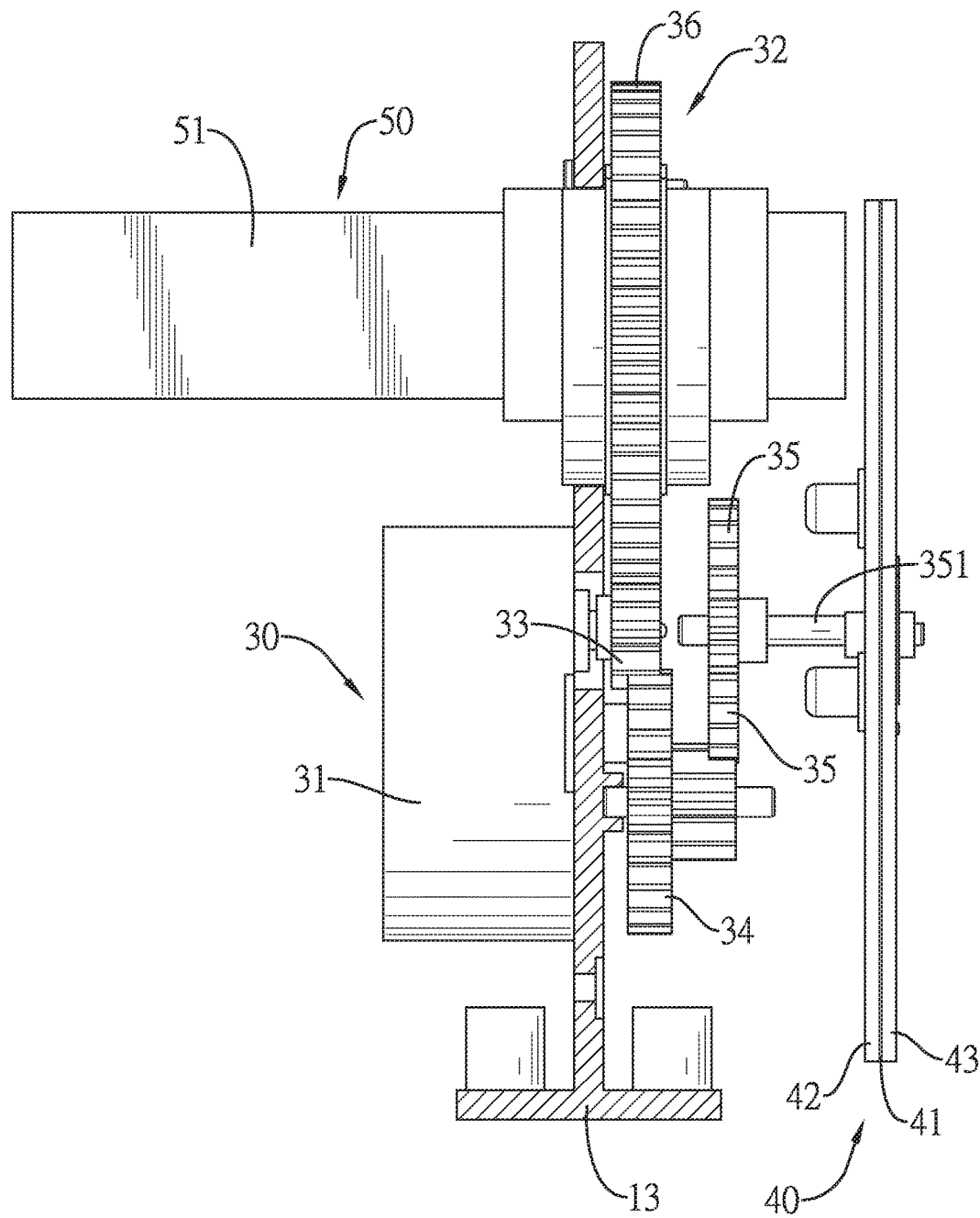
FIG. 7 is a side view of the film unit, the rotating device, and a reflex cone of the projection kaleidoscope in FIG. 2.

With reference to FIGS. 3, 6, and 7, the first supporting seat 13 has a front surface and a rear surface. The driver 31 is mounted on the front surface of the first supporting seat 13. The transmission 32 is mounted on the rear surface of the first supporting seat 13, and has a first gear 33, a second gear 34, a third gear 35, and a fourth gear 36. The first gear 33 is connected to the driver 31. The second gear 34 engages with the first gear 33. The third gear 35 engages with the second gear 34 and has a shaft 351. The film unit 40 is fixedly mounted on the shaft 351 of the third gear 35. The fourth gear 36 engages with the first gear 33. The reflex cone 50 has a rear end extending through the fourth gear 36. A rotation direction of the third gear 35 and a rotation direction of the fourth gear 36 are reverse to each other. In addition, the rotating device 30 has a cover 37. The cover 37 is mounted on the rear surface of the first supporting seat 13 and covers the transmission 32. The transmission 32 further has a fifth gear 38. The fifth gear 38 is connected to the first supporting seat 13 and the cover 37. The fifth gear 38 engages with the fourth gear 36.

With reference to FIGS. 2 to 5, the second supporting seat 14 has a front surface. The light-emitting part 21 has a heat-dissipating fin 211 and a light unit 212. The heat-dissipating fin 211 is mounted on the front surface of the second supporting seat 14. The light unit 212 is mounted on a front surface of the heat-dissipating fin 211. The light converging unit 22 has a connecting tube 23, a first convex lens 24, and a second convex lens 25. The connecting tube 23 is mounted on the heat-dissipating fin 211 and is mounted around the light unit 212. The first convex lens 24 is mounted in the connecting tube 23, faces the light unit 212, and has a first convex arced surface 241. The second convex lens 25 is mounted in the connecting tube 23, faces the first convex lens 24, and has a second convex arced surface 251 facing the first convex arced surface 241 of the first convex lens 24. The connecting tube 23 has an inner portion 26 and an outer portion 27. The inner portion 26 has a first semi-ring 261 and a second semi-ring 262. The second semi-ring 262 is connected to the first semi-ring 261. The first convex lens 24 and the second convex lens 25 are mounted in the inner portion 26 of the connecting tube 23. The outer portion 27 is mounted around the inner portion 26 and is mounted on the heat-dissipating fin 211. Moreover, the light unit 212 is at least one light emitting diode (LED) and generates light beams in multiple colors.

In use, the light-emitting part 21 of the light supply device 20 generates a light beam, and the light beam passes through the first convex lens 24 and the second convex lens 25 of the light converging unit 22. The light beam passes out of the connecting tube 23 and then passes through the film unit 40. A pattern of the film unit 40 is projected into the reflex cone 50 by the light beam, and then the light beam is reflected and refracted many times in the reflex cone 50 by the flat reflex lenses 51 to form diversified pictures. The light beam passes through the projecting convex lens 60 and the diversified pictures are projected out of the projection kaleidoscope. In a projecting process of the projection kaleidoscope, the rotating device 30 drives the film unit 40 and the reflex cone 50 to rotate contrary. The driver 31 drives the first gear 33 of the transmission 32 to rotate. The second gear 34 and the fourth gear 36 are driven by the first gear 33 to rotate. A rotation direction of the second gear 34 and the rotation direction of the fourth gear 36 are the same and are reverse to a rotation direction of the first gear 33. The third gear 35 is driven by the second gear 34 to rotate. The rotation direction of the third gear 35 is reverse to the rotation direction of the second gear 34. The rotation direction of the third gear 35 and the rotation direction of the first gear 33 are the same. The film unit 40 is driven by the third gear 35 to rotate. The reflex cone 50 is driven by the fourth gear 36 to rotate. The rotation direction of the film unit 40 is reverse to the rotation direction of the reflex cone 50.

Accordingly, the diversified pictures formed by the reflex cone 50 may be projected by the projection kaleidoscope, thus allowing many users to view simultaneously. The rotation direction of the film unit 40 and the rotation direction of the reflex cone 50 are reverse to each other for increasing the variations of the diversified pictures.

What is claimed is:

1. A projection kaleidoscope comprising:
    a shell having
        a front side;
        a rear side;
        a chamber formed in the shell;
        a projecting opening formed on the front side of the shell and communicating with the chamber;
        a first supporting seat mounted in the chamber of the shell and facing the front side of the shell; and
        a second supporting seat mounted in the chamber of the shell and facing the rear side of the shell;
    a light supply device mounted on the second supporting seat of the shell, facing the first supporting seat of the shell, and having
        a light-emitting part mounted on the second supporting seat of the shell; and
        a light converging unit mounted on the light-emitting part of the light supply device;
    a rotating device mounted on the first supporting seat of the shell and having a driver mounted on the first supporting seat of the shell; and
    a transmission mounted on the first supporting seat of the shell and connected to the driver of the rotating device;
    a film unit mounted on the transmission of the rotating device and facing the light converging unit of the light supply device; and
    a reflex cone mounted on the transmission of the rotating device and having two ends, the two ends of the reflex cone respectively facing the film unit and the projecting opening; and
    a projecting convex lens mounted in the projecting opening of the shell and facing the reflex cone;
        wherein the rotating device drives the film unit and the reflex cone to rotate relative to each other, and a rotation direction of the film unit and a rotation direction of the reflex cone are reverse to each other.

2. The projection kaleidoscope as claimed in claim 1, wherein the reflex cone has three flat reflex lenses and a space, the three flat reflex lenses are connected to each other to form a triangular tube, and the space is formed in the reflex cone and is surrounded by the three flat reflex lenses.

3. The projection kaleidoscope as claimed in claim 2, wherein the first supporting seat has a front surface and a rear surface;
the driver is mounted on the front surface of the first supporting seat; and
the transmission is mounted on the rear surface of the first supporting seat and has
    a first gear connected to the driver;
    a second gear engaging with the first gear;
    a third gear engaging with the second gear and having a shaft, wherein the film unit is fixedly mounted on the shaft of the third gear; and
    a fourth gear engaging with the first gear, wherein the reflex cone has a rear end extending through the fourth gear, and a rotation direction of the third gear and a rotation direction of the fourth gear are reverse to each other.

4. The projection kaleidoscope as claimed in claim 3, wherein
the second supporting seat has a front surface;
the light-emitting part has
    a heat-dissipating fin mounted on the front surface of the second supporting seat and having a front surface; and
    a light unit mounted on the front surface of the heat-dissipating fin; and
the light converging unit has
    a connecting tube mounted on the heat-dissipating fin and mounted around the light unit;
    a first convex lens mounted in the connecting tube, facing the light unit, and having a first convex arced surface; and
    a second convex lens mounted in the connecting tube, facing the first convex lens, and having a second convex arced surface facing the first convex arced surface of the first convex lens.

5. The projection kaleidoscope as claimed in claim 4, wherein the connecting tube has an inner portion and an outer portion, the inner portion has a first semi-ring and a second semi-ring, the second semi-ring is connected to the first semi-ring, the first convex lens and the second convex lens are mounted in the inner portion of the connecting tube, and the outer portion is mounted around the inner portion and is mounted on the heat-dissipating fin.

6. The projection kaleidoscope as claimed in claim 2, wherein
the second supporting seat has a front surface;
the light-emitting part has
    a heat-dissipating fin mounted on the front surface of the second supporting seat and having a front surface; and
    a light unit mounted on the front surface of the heat-dissipating fin; and
the light converging unit has
    a connecting tube mounted on the heat-dissipating fin and mounted around the light unit;
    a first convex lens mounted in the connecting tube, facing the light unit, and having a first convex arced surface; and
    a second convex lens mounted in the connecting tube, facing the first convex lens, and having a second convex arced surface facing the first convex arced surface of the first convex lens.

7. The projection kaleidoscope as claimed in claim 6, wherein the connecting tube has an inner portion and an outer portion, the inner portion has a first semi-ring and a second semi-ring, the second semi-ring is connected to the first semi-ring, the first convex lens and the second convex lens are mounted in the inner portion of the connecting tube, and the outer portion is mounted around the inner portion and is mounted on the heat-dissipating fin.

8. The projection kaleidoscope as claimed in claim 1, wherein the reflex cone has multiple flat reflex lenses and a space, the multiple flat reflex lenses are connected to each other to form a polygonal tube, and the space is formed in the reflex cone and is surrounded by the multiple flat reflex lenses.

9. The projection kaleidoscope as claimed in claim 8, wherein
the first supporting seat has a front surface and a rear surface;
the driver is mounted on the front surface of the first supporting seat; and
the transmission is mounted on the rear surface of the first supporting seat and has
a first gear connected to the driver;
a second gear engaging with the first gear;
a third gear engaging with the second gear and having a shaft, wherein the film unit is fixedly mounted on the shaft of the third gear; and
a fourth gear engaging with the first gear, wherein the reflex cone has a rear end extending through the fourth gear, and a rotation direction of the third gear and a rotation direction of the fourth gear are reverse to each other.

10. The projection kaleidoscope as claimed in claim 9, wherein the second supporting seat has a front surface;
the light-emitting part has
a heat-dissipating fin mounted on the front surface of the second supporting seat and having a front surface; and
a light unit mounted on the front surface of the heat-dissipating fin; and
the light converging unit has
a connecting tube mounted on the heat-dissipating fin and mounted around the light unit;
a first convex lens mounted in the connecting tube, facing the light unit, and having a first convex arced surface; and
a second convex lens mounted in the connecting tube, facing the first convex lens, and having a second convex arced surface facing the first convex arced surface of the first convex lens.

11. The projection kaleidoscope as claimed in claim 10, wherein the connecting tube has an inner portion and an outer portion, the inner portion has a first semi-ring and a second semi-ring, the second semi-ring is connected to the first semi-ring, the first convex lens and the second convex lens are mounted in the inner portion of the connecting tube, and the outer portion is mounted around the inner portion and is mounted on the heat-dissipating fin.

12. The projection kaleidoscope as claimed in claim 8, wherein
the second supporting seat has a front surface;
the light-emitting part has
a heat-dissipating fin mounted on the front surface of the second supporting seat and having a front surface; and
a light unit mounted on the front surface of the heat-dissipating fin; and
the light converging unit has
a connecting tube mounted on the heat-dissipating fin and mounted around the light unit;
a first convex lens mounted in the connecting tube, facing the light unit, and having a first convex arced surface; and
a second convex lens mounted in the connecting tube, facing the first convex lens, and having a second convex arced surface facing the first convex arced surface of the first convex lens.

13. The projection kaleidoscope as claimed in claim 12, wherein the connecting tube has an inner portion and an outer portion, the inner portion has a first semi-ring and a second semi-ring, the second semi-ring is connected to the first semi-ring, the first convex lens and the second convex lens are mounted in the inner portion of the connecting tube, and the outer portion is mounted around the inner portion and is mounted on the heat-dissipating fin.

14. The projection kaleidoscope as claimed in claim 1, wherein
the first supporting seat has a front surface and a rear surface;
the driver is mounted on the front surface of the first supporting seat; and
the transmission is mounted on the rear surface of the first supporting seat and has
a first gear connected to the driver;
a second gear engaging with the first gear;
a third gear engaging with the second gear and having a shaft, wherein
the film unit is fixedly mounted on the shaft of the third gear; and
a fourth gear engaging with the first gear, wherein the reflex cone has a rear end extending through the fourth gear, and a rotation direction of the third gear and a rotation direction of the fourth gear are reverse to each other.

15. The projection kaleidoscope as claimed in claim 14, wherein
the second supporting seat has a front surface;
the light-emitting part has
a heat-dissipating fin mounted on the front surface of the second supporting seat and having a front surface; and
a light unit mounted on the front surface of the heat-dissipating fin; and
the light converging unit has
a connecting tube mounted on the heat-dissipating fin and mounted around the light unit;
a first convex lens mounted in the connecting tube, facing the light unit, and having a first convex arced surface; and
a second convex lens mounted in the connecting tube, facing the first convex lens, and having a second convex arced surface facing the first convex arced surface of the first convex lens.

16. The projection kaleidoscope as claimed in claim 15, wherein the connecting tube has an inner portion and an outer portion, the inner portion has a first semi-ring and a second semi-ring, the second semi-ring is connected to the first semi-ring, the first convex lens and the second convex lens are mounted in the inner portion of the connecting tube, and the outer portion is mounted around the inner portion and is mounted on the heat-dissipating fin.

17. The projection kaleidoscope as claimed in claim 1, wherein
the second supporting seat has a front surface;
the light-emitting part has a heat-dissipating fin mounted on the front surface of the second supporting seat and having a front surface; and a light unit mounted on the front surface of the heat-dissipating fin; and the light converging unit has a connecting tube mounted on the heat-dissipating fin and mounted around the light unit;

a first convex lens mounted in the connecting tube, facing the light unit, and having a first convex arced surface; and a second convex lens mounted in the connecting tube, facing the first convex lens, and having a second convex arced surface facing the first convex arced surface of the first convex lens.

18. The projection kaleidoscope as claimed in claim 17, wherein the connecting tube has an inner portion and an outer portion, the inner portion has a first semi-ring and a second semi-ring, the second semi-ring is connected to the first semi-ring, the first convex lens and the second convex lens are mounted in the inner portion of the connecting tube, and the outer portion is mounted around the inner portion and is mounted on the heat-dissipating fin.

\* \* \* \* \*